United States Patent
Jung et al.

(10) Patent No.: US 8,107,793 B2
(45) Date of Patent: Jan. 31, 2012

(54) APPARATUS AND METHOD FOR CONTROLLING DISPERSION RECORD AND PLAY OF MOVING PICTURE

(75) Inventors: Dong-shin Jung, Suwon-si (KR); Joo-yeol Lee, Seoul (KR); Seung-jae Oh, Seoul (KR); Se-hee Han, Seoul (KR); Won-Seok Kwon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1348 days.

(21) Appl. No.: 11/727,067

(22) Filed: Mar. 23, 2007

(65) Prior Publication Data
US 2007/0286569 A1    Dec. 13, 2007

Related U.S. Application Data

(60) Provisional application No. 60/793,254, filed on Apr. 20, 2006.

(30) Foreign Application Priority Data

Dec. 15, 2006    (KR) .................. 10-2006-0128686

(51) Int. Cl.
*H04N 5/76* (2006.01)
(52) U.S. Cl. ....................... 386/291; 386/292
(58) Field of Classification Search ............... 386/291, 386/292, 293, 295, 296
See application file for complete search history.

(56) References Cited

U.S. PATENT DOCUMENTS

| | | | |
|---|---|---|---|
| 2003/0235393 A1 | 12/2003 | Boston et al. | |
| 2004/0101271 A1 | 5/2004 | Boston et al. | |
| 2005/0010904 A1* | 1/2005 | Morioka | 717/120 |

FOREIGN PATENT DOCUMENTS

| | | |
|---|---|---|
| JP | 2004-260767 A | 9/2004 |
| JP | 2004-312414 A | 11/2004 |
| KR | 10-2003/0067981 A | 8/2003 |
| KR | 10-2004/0031508 A | 4/2004 |
| KR | 10-2005/0081431 A | 8/2005 |
| KR | 1020050087151 A | 8/2005 |
| WO | 03/036954 A1 | 5/2003 |
| WO | 2004/090753 A1 | 10/2004 |

OTHER PUBLICATIONS

Communication from the Japanese Patent Office dated Jun. 21, 2011 in a counterpart application No. 2009-506408.

* cited by examiner

*Primary Examiner* — Robert Chevalier
(74) *Attorney, Agent, or Firm* — Sughrue Mion, PLLC (57) ABSTRACT

An apparatus and method for controlling a dispersion recording and playback of a moving picture are provided. The apparatus which controls a dispersion record of a moving picture includes, a recording unit that generates a record schedule when a predetermined moving picture is reserved-recorded, generates a reserved-recording-object when it is a reserved-recording time, and dispersedly records the moving picture in another storage device if an error occurs due to insufficient storage space when the moving picture is recorded; a recording-device-selecting unit that selects a recording device based on the preferences of storage devices before the moving picture is reserved-recorded, and a CDS-managing unit that manages recording information of the recorded moving picture, information of moving picture that has been recorded and the recording device.

8 Claims, 10 Drawing Sheets

```
[RESPONSE]
BrowseRecordSchedules ("
        <?xml version="1.0" encoding="UTF -8"?>
    <srs
        ...
        <item id="s103">
            <title>Life of a Software Developer</title>
            <class>OBJECT.RECORDSCHEDULE.DIRECT.CDSNONEPG</class>
            <priority>L1</priority>
            <recordDestinationGroup>
                < recordDestination mediaType = "HDD" preference="1">
                        Local Hard Disk
                </ recordDestination>
                < recordDestination mediaType ="HDD" preference= 2">
                        targetURL ="http://192.168.0.12/SharedFolder"> DTV Hard Disk
                </ recordDestination>
                < recordDestination mediaType = "HDD" preference= 3">
                        targetURL ="http://192.168.0.15/Drama">PC Hard Disk
                </ recordDestination>
            </ recordDestinationGroup>
            < scheduledCDSObjectID >User_Channel_5</ scheduledCDSObjectID>
            < scheduledStartDateTime >MONT19:00:00</ scheduledStartDateTime >
            < scheduledDuration >P03:00:00</ scheduledDuration>
        </item>
    </srs>" ,1,1,123456
```

```
[RESPONSE]
BrowseRecordSchedules("
        <?xml version="1.0" encoding="UTF 8"?>
    <srs
            ...
            <item id="s103">
                    <title>Batman</title>
                            <class>OBJECT.RECORDSCHEDULE.DIRECT.CDSNONEPG</class>
                    <priority>L1</priority>
                    </recordDestination mediaType ="HDD" preference="1">
                            Hard Disk
                    </ recordDestination>
                    < recordDestination mediaType ="HDD" preference="2"
                    targetURL  ="http://192.168.0.12/MyNAS/RecordedTV">
                            Shared Content
                    </ recordDestination>
                    <scheduledCDSObjectID>
                            User_Channel_5
                    </ scheduledCDSObjectID>
                    </ scheduledStartDateTime>
                            MONT19:00:00
                    </ scheduledStartDateTime>
                    < scheduledDuration>P01:00:00</ scheduledDuration>
                    < scheduleState
                    currentErrors="">
                            OPERATIONAL
                    </ scheduleState>
                    < abnormalTasksExist>0  </abnormalTasksExist>
                    < currentRecordTaskCount>2  </currentRecordTaskCount>
            </item>
    </srs> " .1.1.123456
)
```

420 — (box around recordDestination elements)

APPARATUS AND METHOD FOR CONTROLLING DISPERSION RECORD AND PLAY OF MOVING PICTURE

CROSS-REFERENCE TO RELATED APPLICATION

This application claims priority from Korean Patent Application No. 10-2006-0128686 filed on Dec. 15, 2006 in the Korean Intellectual Property Office, and the benefit of U.S. Provisional Patent Application No. 60/793,254 filed on Apr. 20, 2006 in the U.S. Patent and Trademark Office, the disclosures of which are incorporated herein by reference in their entirety.

BACKGROUND OF THE INVENTION

1. Field of the Invention

Apparatuses and methods consistent with the present invention relate to the recording and playback of a moving picture, and more particularly to an apparatus and method for controlling a dispersion recording and playback of a moving picture.

2. Description of the Related Art

As digital televisions (TVs) become popular, various types of audio and visual (AV) multimedia data is often transmitted and stored in a specific device within a specific network domain such as a home network, and therefore the number of devices having a storage device such as a hard disk drive (HDD) is increasing.

Generally, a method of providing a scheduled recording based on an electronic program guide (EPG) provided at the time of recording or some other time, a channel, and other broadcast information input by a user, is used. And a method of selecting and recording to one device included in a list of recording devices set at the recording time is used as a method of storing broadcast data.

Figure 1:
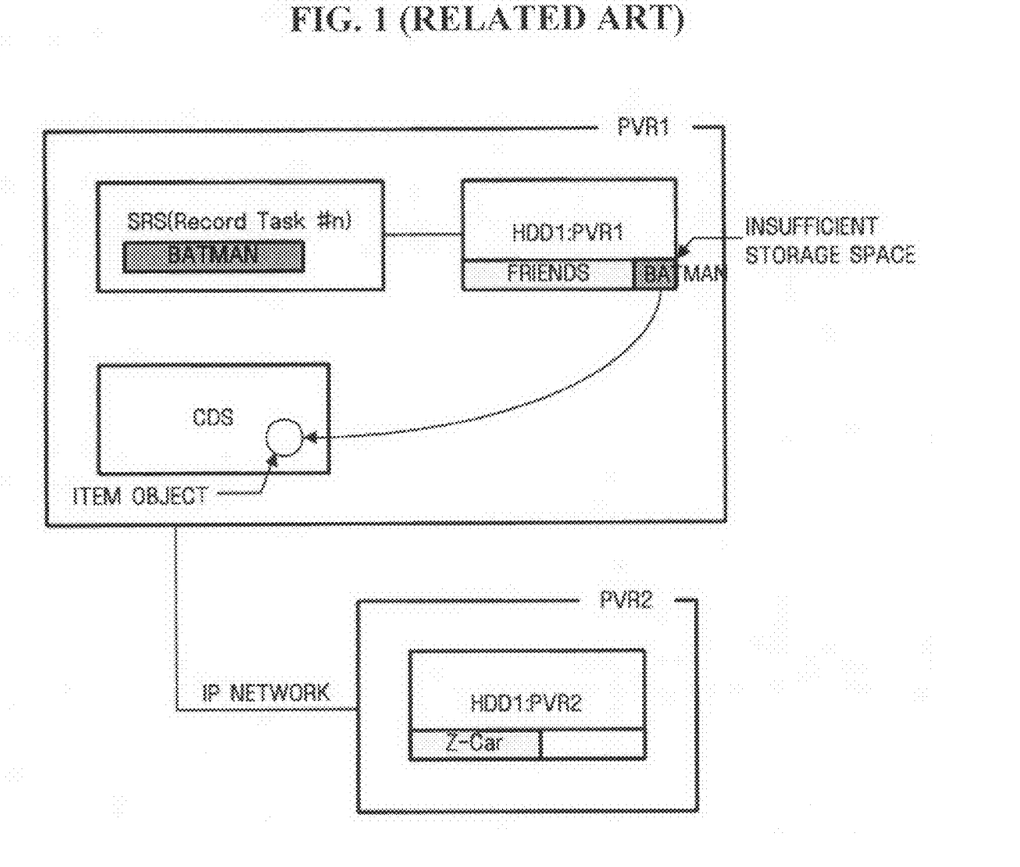
FIG. 1 depicts a program-recording method in the related art.

FIG. 1 depicts a program-recording method in the related art.

As shown in FIG. 1, a recording schedule is generated by receiving a user's input value from a user interface (UI) using the scheduled recording service (SRS). The SRS, which is used to record broadcasts in universal plug and play (UPnP) devices, was developed based on UPnP AV standards.

The generated recording schedule is operated by one or more record tasks. The record task is subordinate to a specific recording schedule, which performs the role of the recording schedule. HDD1 records the data at a time set by the SRS, however, other types of storage media may be used.

The content directory service (CDS) provided by the UPnP AV standards manages information on the to be recorded data or information on recorded data as a directory type. Here, the information is configured in a container object such as a directory and an item object such as a file.

A personal video recorder (PVR) is a storage device. In FIG. 1, a personal video recorder 1 (PVR1) is a storage device that exists in the same position with the SRS. PVR2 is another storage device connected to the same network as the PVR1.

In the step of storing broadcast data, information of the broadcast program scheduled via the SRS is managed by a recording schedule. When it is time to start recording, a reserved-recording object is generated by operating the corresponding record task. The above process can be performed several minutes ahead of the start time.

In the step of generating a reserved-recording object, the SRS selects an available storage device by searching for the recording device in a preference order determined by a user, and performs recording in the device selected based on preferences of each device among the selected storage devices. The PVR1 stores the broadcast program received from a tuner or some other receiving device according to a predetermined data format.

The recording schedule object manages a recording process until the scheduled recording is completed. If an error occurs due to a shortage of storage space during the recording, the recording schedule object stops storing the file, generates an item object corresponding to the data recorded in the CDS, and completes the scheduled recording. In this case, the generated item object of the CDS is the defective recording data, finished at an optional time, instead of a recording of the entire program that a user expects.

This method of storing broadcast data in the related art has a problem in that it is difficult to cope with a shortage of storage space. If a recording is abnormally completed because an error occurs when the SRS records the program data requested by a user, the recording is not completed even though other storage devices in the network are available.

While broadcast data is recorded in the device selected based on preferences of each device among recording devices, if the data is stored in another preferred storage device due to the shortage of storage space in a first storage device, there is a problem in that it is difficult to continuously play the data, which was dispersedly stored at the time of recording, during playback because there is no mechanism that manages dispersedly stored data. Accordingly, if data is dispersedly stored throughout the network, it is inconvenient in that a user has to find data connected corresponding to the dispersedly stored data during playback.

Therefore, an apparatus is that stores a moving picture file in another storage device connected to a network, and continuously plays the dispersedly stored moving picture file when an error occurs due to a shortage of storage space is desired.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, it is an aspect of the present invention to dispersedly record a moving picture being recorded in another storage device when there is insufficient storage space in a UPnP based reserved-recording environment.

It is another aspect of the present invention to continuously play the dispersedly recorded moving picture based on a playlist for a moving picture.

This and other aspects and features of the present invention will become clear to those skilled in the art upon review of the following description, attached drawings and appended claims.

According to an aspect of the present invention, there is provided an apparatus for controlling a dispersion recording of a moving picture, the apparatus including a recording unit that generates a recording schedule if a moving picture is scheduled to be recorded, generates a reserved-recording object when it is a reserved recording time, and dispersedly records the moving picture in another storage device if an error occurs due to insufficiency of a storage space when the moving picture is recorded, a recording-device-selecting unit that selects a recording device based on preferences of each storage device before the moving picture is reserved-recorded, and a CDS-managing unit that manages recording information of the recorded moving picture, information of moving picture that has been recorded and the recording device.

According to another aspect of the present invention, there is provided a method for controlling a dispersion record of a moving picture, the method including generating a record schedule needed when predetermined a moving picture is reserved-recorded, generating a reserved-recording object when it is a reserved recording time, selecting a recording device based on preferences of each storage device before the moving picture is reserved-recorded, storing the moving picture in the selected first storage device, checking whether an error occurs due to insufficiency of a storage space, if an error occurs in the checked result, generating an item object for the error, and dispersedly storing the moving picture in a second storage device.

BRIEF DESCRIPTION OF THE DRAWINGS

The above and other features and aspects of the present invention will become apparent by describing in detail exemplary embodiments thereof with reference to the attached drawings in which.

DETAILED DESCRIPTION OF THE
EXEMPLARY EMBODIMENTS OF THE
PRESENT INVENTION

Exemplary embodiments of the present invention will be described in detail with reference to the accompanying drawings.

Aspects and features of the present invention, and methods of accomplishing the same, may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 2:
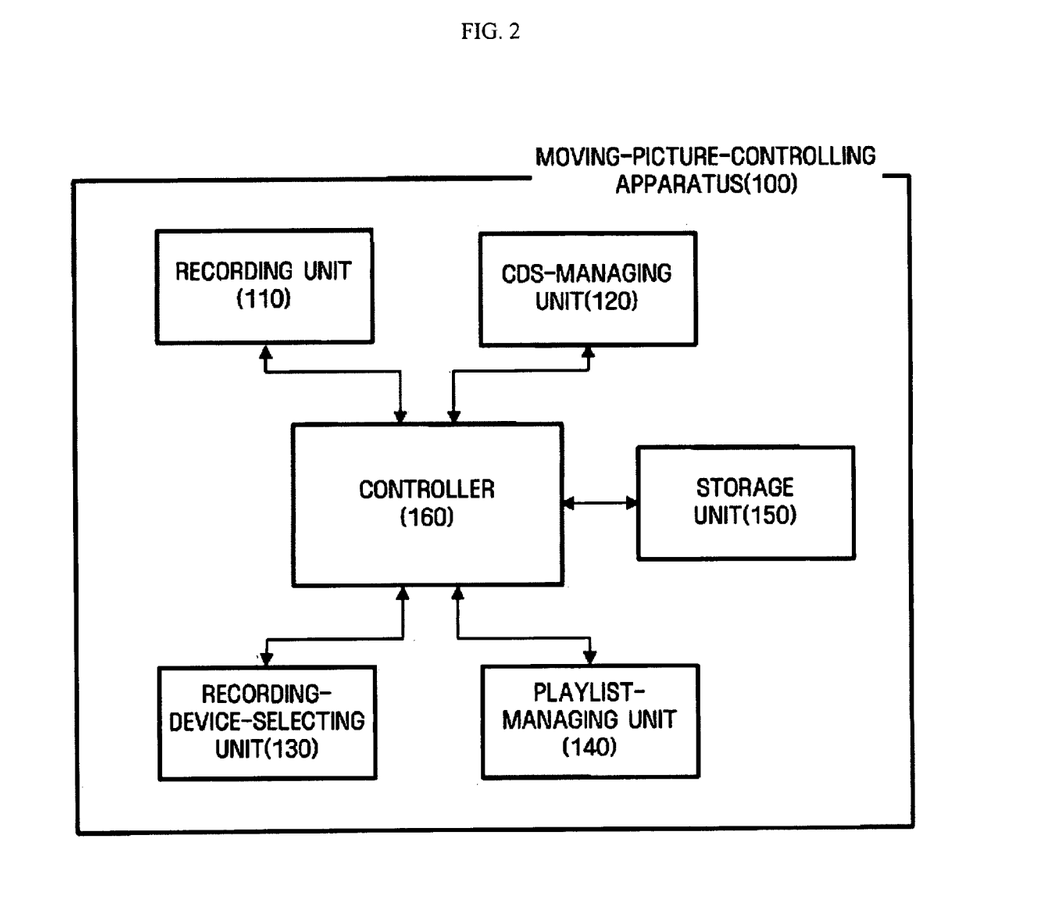
FIG. 2 is an inside block diagram of an apparatus for controlling a dispersion recording and playback of a moving picture according to an exemplary embodiment of the present invention.

FIG. 2 is an inside block diagram of an apparatus for controlling a dispersion recording and playback of a moving picture according to an exemplary embodiment of the present invention.

Referring to FIG. 2, a moving-picture-controlling apparatus 100 includes a recording unit 110, a CDS-managing unit 120, a recording-device-selecting unit 130, a playlist-managing unit 140, a storage unit 150, and a controller 160. In this exemplary embodiment, a moving picture may include, but is not limited to, multimedia data (e.g., broadcast data) transmitted in real time.

The term "unit", as used herein, means, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The recording unit 110 generates a record schedule based on a user's input unit for scheduling the recording of a moving picture using an SRS, and records the corresponding moving picture based on the generated record schedule. The SRS was developed based on the UPnP AV standard, which uses UPnP apparatuses for broadcast recording.

For example, the recording unit 110 checks whether it is a scheduled recording time based on the record schedule, and generates a reserved-recording object if it is the scheduled recording time. Here, the generated reserved-recording object is managed by the CDS-managing unit 120 as a playlist container object.

The recording unit 110 generates an item object when the storing of the moving picture is completed or when an error occurs due to a shortage of storage space. The item object is managed by the CDS-managing unit 120 as a playlist-item object.

The CDS-managing unit 120 manages recording information of the to-be-recorded moving picture and information on the moving picture that has been recorded as a virtual directory format. Here, the virtual directory is configured with a container, i.e., an object such as a directory and an item, i.e., an object such as a file.

For example, the CDS-managing unit 120 manages the reserved-recording object generated by the recording unit 110 as a playlist-container object, which was generated when a process of storing a moving picture was completed or when an error occurred, as a playlist-container object in a playlist container. Here, the playlist-container object is stored as a lower object of the playlist container.

When the reserved-recording object is generated, the recording-device-selecting unit 130 selects the recording device based on preferences of each device. The CDS-managing unit 120 manages information on the selected recording device as a record-schedule object.

The recording-device-selecting unit 130 searches for a list of recording devices selected by a user at the reserved recording time before the reserved recording is performed by communicating with the controller 160, and selects a recording device among the found devices, which are available, based on the preferences of the devices.

The recording-device-selecting unit 130 may operate according to an XML of the record schedule object.

If the record schedule object uses a tag such as "recordDestinationGroup", it is possible to successively record a moving picture because the recording devices arranged in the tag are recognized as a group.

The playlist-managing unit 140 manages a playlist of the dispersedly stored moving picture as a playlist item that belongs in an object class provided by the UPnP standard. Here, the playlist refers to a real file of the moving picture that was dispersedly recorded. Accordingly, a single moving picture, which is dispersedly recorded, can be continuously played through each playlist.

If the moving picture is dispersedly stored in storage devices included in a recording device group successively, the playlist item of the CDS-managing unit 120 is updated. By searching for the corresponding playlist at play time based on the playlist item of the CDS-managing unit 120, it is possible to continuously access all moving pictures that were dispersedly stored.

The storage unit 150 stores the recorded moving picture. The storage unit refers to an HDD and various types of storage media.

When a user requests a moving picture file for playback, the controller 160 tracks a position where the moving picture file is stored by referring to the playlist item stored in the CDS, and then continuously plays the moving picture that was dispersedly stored.

The controller 160 controls operations of each functional block 110 through 150 that configure the moving-picture-controlling apparatus 100.

Figure 3:
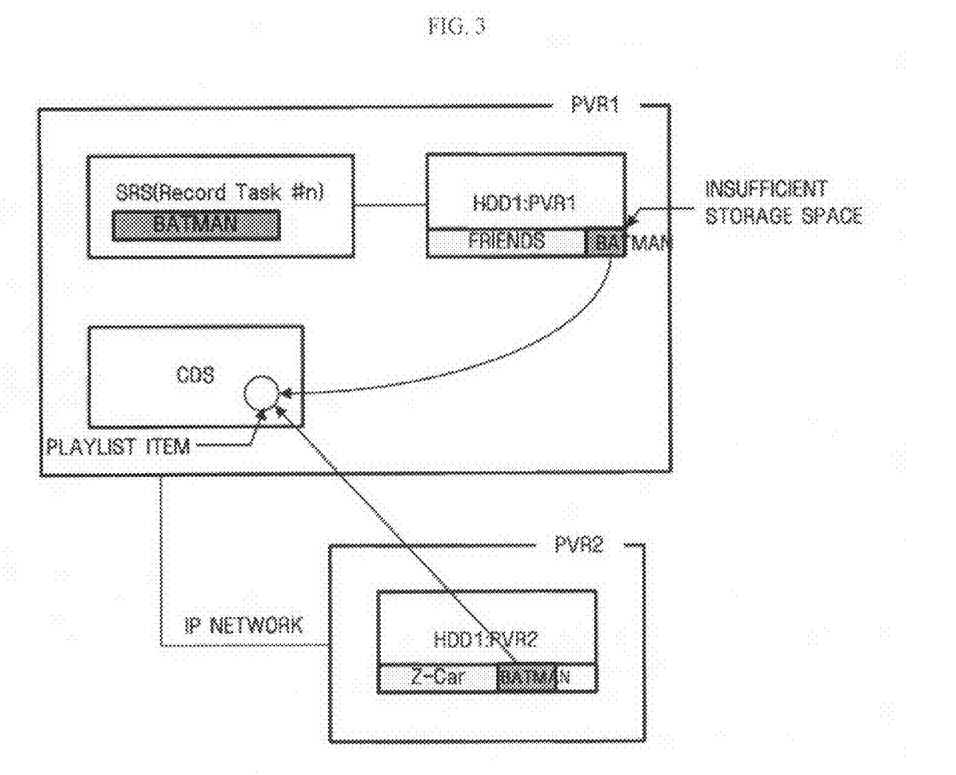
FIG. 3 illustrates an example of managing dispersion data in an apparatus for controlling a dispersion recording and playback of a moving picture according to an exemplary embodiment of the present invention.

FIG. 3 illustrates an example of managing dispersion data in an apparatus for controlling a dispersion recording and playback of a moving picture according to an exemplary embodiment of the present invention. Here, PRV1 and PRV2 exist as a storage device and it is assumed that the first preferred device is PRV1 and the second preferred device is PRV2.

As shown in FIG. 3, the recording unit 110 generates the record schedule based on a user's input values needed to schedule a recording using the SRS. Here, the record schedule is operated by one or more record tasks.

The recording unit 110 checks whether it is time to record based on the record schedule. When it is time to record, the recording unit 110 generates a scheduled recording object in the CDS. Here, the scheduled recording object is generated as a playlist container in the CDS.

The recording-device-selecting unit 130 selects an available storage device by searching for the recording device preferences predetermined by a user before the scheduled recording is performed. Information on the devices selected based on the preferences of the devices among the selected storage devices is managed in the CDS as a record schedule.

If the scheduled recording is performed when it is the reserved-recording time, the corresponding moving picture (e.g., Batman) is recorded in the selected device based on preferences (e.g., HDD1 of PRV1). If an error occurs due to a shortage of storage space during recording of the moving picture, the SRS is notified of the error. The recording unit 110 searches for a second preferred storage device (e.g., HDD1 of PRV2) based on the record schedule object stored in the CDS, and records the corresponding moving picture in the found storage device. When an error occurs, the SRS of the recording unit 110 generates the playlist item in the CDS, and updates a uniform resource locator (URL) including a first file name in the playlist item.

Figure 4A:
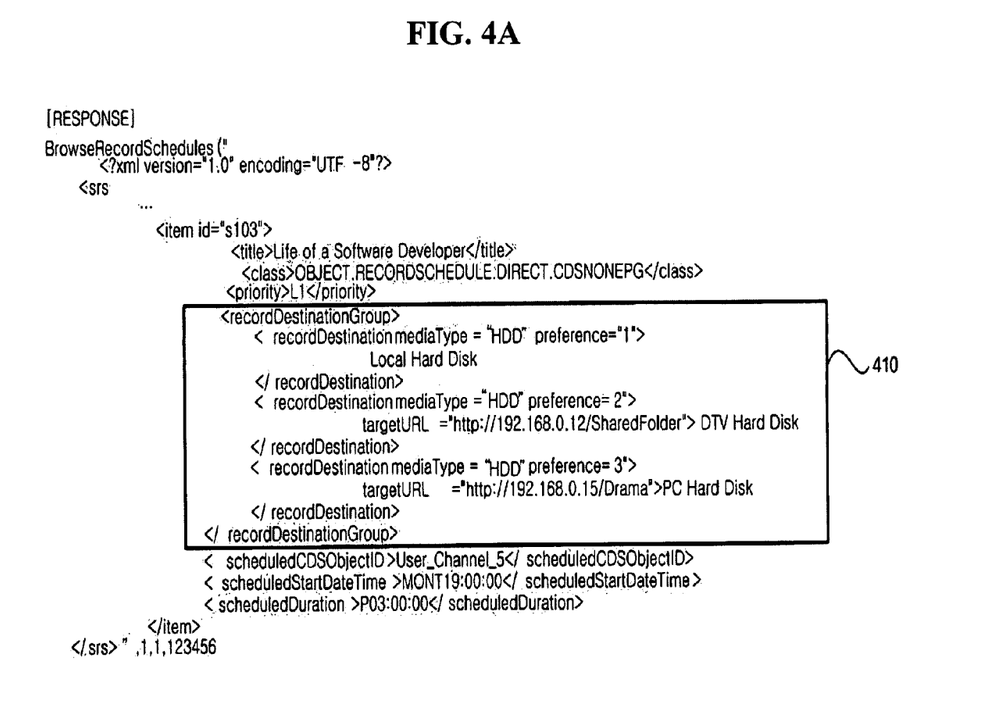
FIGS. 4A and 4B depict a recording schedule for selecting a recording device in an apparatus for collectively storing selected areas of an image according to an exemplary embodiment of the present invention.
Figure 4B:
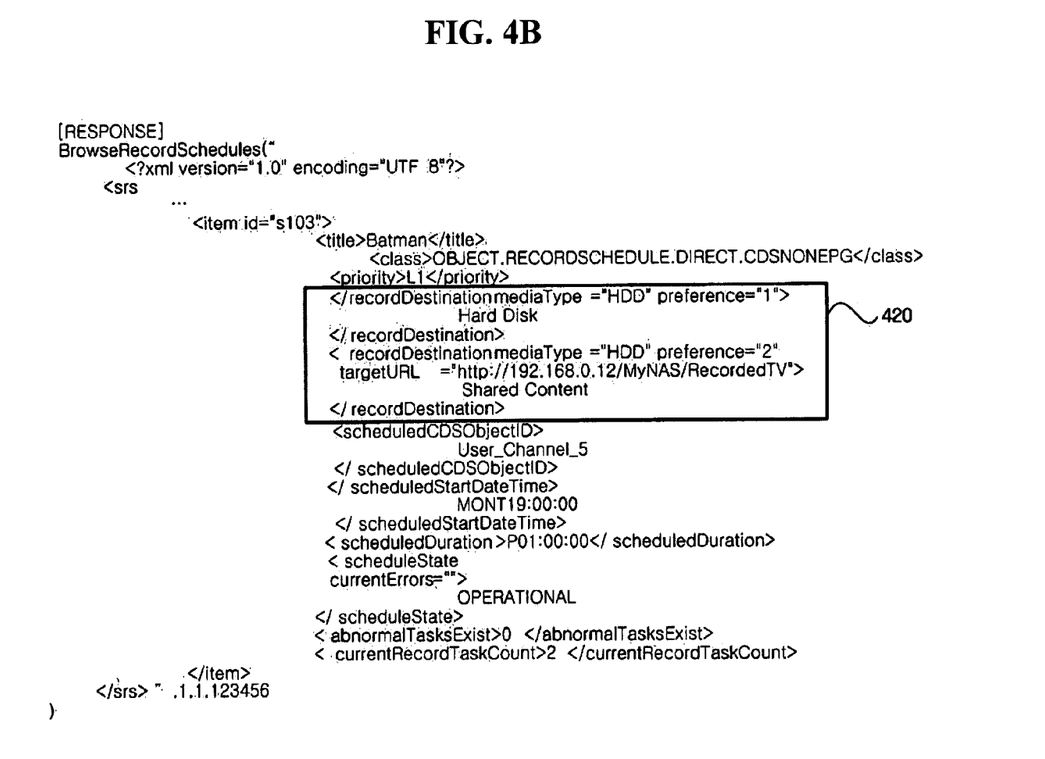

FIGS. 4A and 4B depict a record schedule for selecting a recording device in an apparatus for collectively storing selected areas of an image according to an exemplary embodiment of the present invention.

As shown in FIG. 4A, by setting recording devices in the record schedule as a group 410, when storage space is insufficient while a predetermined moving picture is recorded, it is possible to dispersedly record the corresponding moving picture in another device included in the group.

For example, a first HDD, a second HDD, and a third HDD are set as the group 410. When it is time to record a moving picture, a storage device set based on preferences is checked and the moving picture is stored in the corresponding storage device (the first HDD). If a space of the first HDD is insufficient while the moving picture is recorded, the moving picture is also stored in the second HDD.

As shown in FIG. 4B, even if the recording devices are not set as a group, when storage space is insufficient while a predetermined moving picture is recorded, it is possible to dispersedly record the corresponding moving picture in another device included in the record schedule by setting available storage devices 420 in the record schedule.

If the first HDD and the second HDD are set as available storage devices, the moving picture can be stored in the second HDD when the space of the first HDD is insufficient while the moving picture is recorded.

Figure 5:
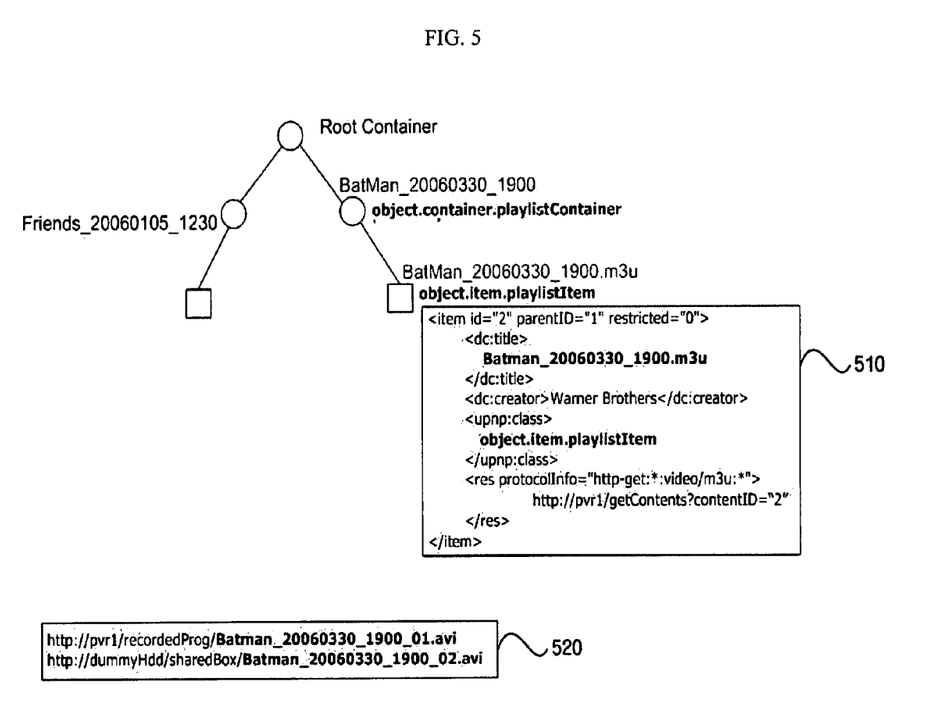
FIG. 5 depicts the configuration of a playlist within the content directory service (CDS) in an apparatus for controlling a dispersion recording and playback of a moving picture according to an exemplary embodiment of the present invention.

FIG. 5 depicts the configuration of a playlist within the content directory service (CDS) in an apparatus for controlling a dispersion recording and playback of moving picture according to an exemplary embodiment of the present invention. An example of a playlist of a moving picture that is dispersedly stored as two files will be described later.

As shown in FIG. 5, there is a root container that manages a playlist of the moving picture whose record is completed, which includes a playlist container based on a title of each recorded moving picture. The corresponding playlist item is included in each playlist container.

Each playlist item 510 may be configured with one CDS item XML. The file to be used by a user exists between the <dc:title>tags. A real playlist 520 can be loaded by URL that exists between the <res>tags. The playlist refers to a real file of the moving picture that was dispersedly recorded, and one moving picture can be continuously played through each playlist.

Figure 6:
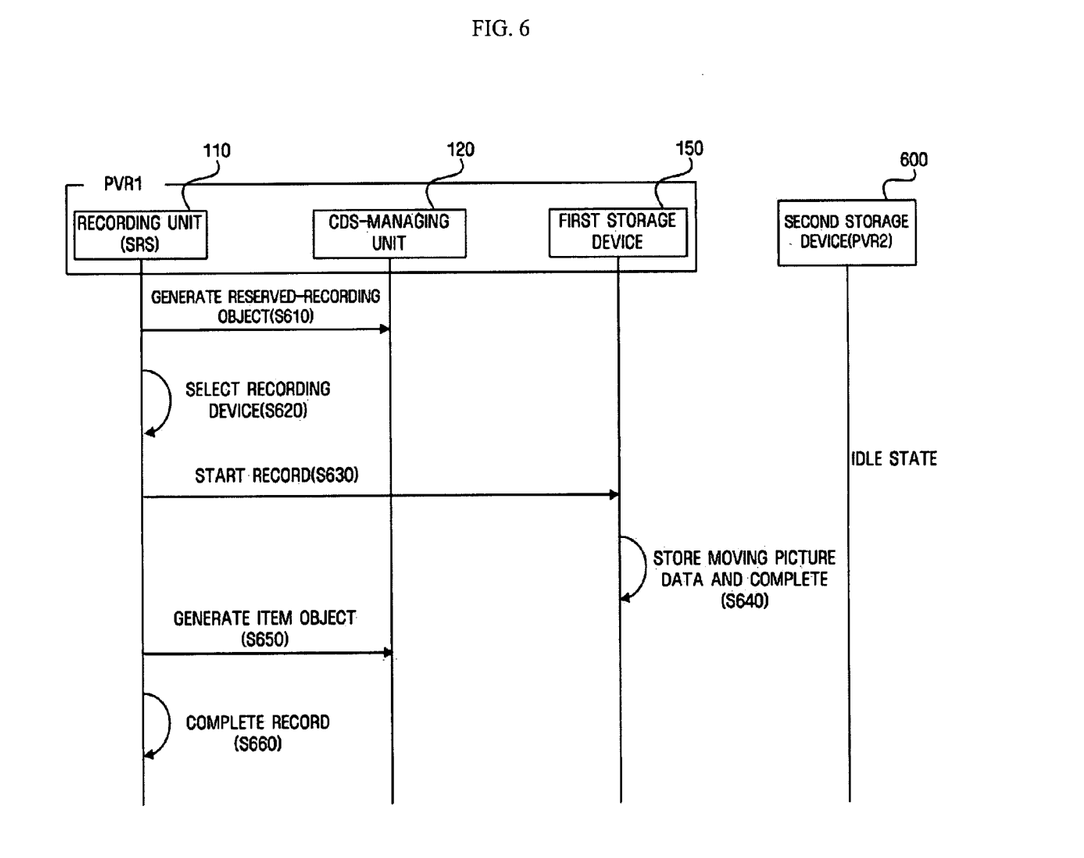
FIG. 6 is a flow chart showing a case where a moving picture is normally stored in a first storage device according to a method of controlling a dispersion recording and playback of a moving picture according to an exemplary embodiment of the present invention.

FIG. 6 is a flow chart showing a case where a moving picture is normally stored in a first storage device of a method of controlling a dispersion recording and playback of a moving picture according to an exemplary embodiment of the present invention. Here, a first storage device 150 and a second storage device 600 exist. The first storage device 150 refers to a storage unit including the recording unit 110 and the CDS-managing unit 120, which exists in PVR1.

It is assumed that a user already reserves a recording through the SRS of the recording unit 110, there is a record schedule corresponding to a scheduled record, and a reserved-recording object is generated in the CDS through a record task performing each record schedule. Time information, channel information, and recording device information, which are needed to perform a real recording, are included in the record schedule through a UI application.

The SRS of the recording unit 110 generates a reserved-record object based on the reserved-record-setting value set by a user (operation S610). Here, the reserved-record object is managed by the CDS-managing unit 120 as a playlist container.

Before starting a recording, the recording-device-selecting unit searches for a recording device list selected by a user at a scheduled recording time, and selects a recording device (e.g., the first storage device) among the found available devices based on preferences of each device. The CDS-managing unit manages information on the selected recording device as a record schedule. The recording unit 110 can select a next storage device by referring to the record schedule when there is insufficient space of storage device, and therefore it is possible to overcome errors that occur due to a shortage of storage space.

The SRS selects a storage device that will store a moving picture based on the order of the recording device set in the record schedule and the information selected by the recording-device-selecting unit (operation S620). Here, the HDD (i.e., the first storage device 150) within the first preferred device (e.g., PVR1) is selected.

When the scheduled recording starts (operation S630), the selected first-storage device 150 stores the moving picture (operation S640). The storage method depends upon the device manufacturer. However, because the name of the generated moving picture file is set by the SRS as a URL, it is possible to read the moving picture file by accessing the first storage device through the URL information.

When the moving picture has been stored in the first storage device 150, the SRS generates an item object (operation S650). The item object is managed by the CDS-managing unit 120 as a playlist item that is stored as a lower object of the playlist container.

When the moving picture file has been stored in the first storage device 150, the recording is completed (operation S660).

Figure 7:
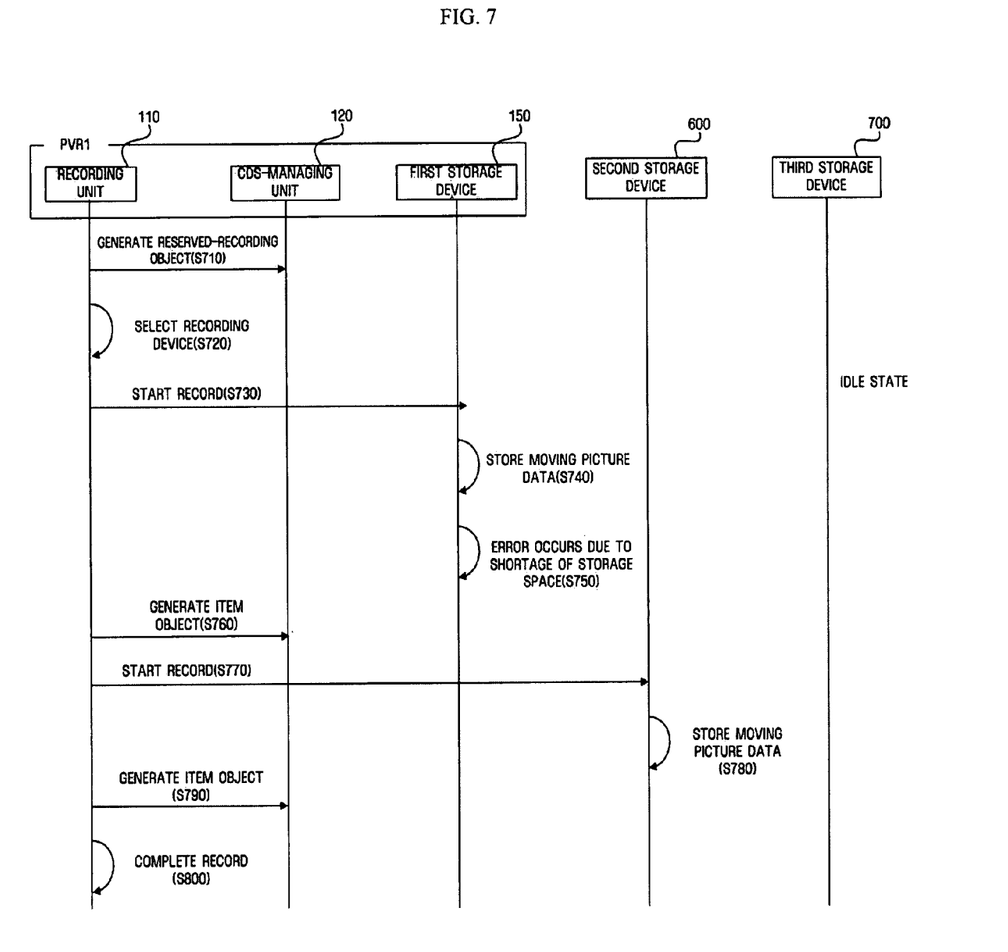
FIG. 7 is a flow chart showing a case where a moving picture is dispersedly stored in a first and second storage device according to a method of controlling a dispersion recording and playback of a moving picture according to an exemplary embodiment of the present invention.

FIG. 7 is a flow chart showing a case where a moving picture is dispersedly stored in a first and second storage device using a method of controlling a dispersion recording and playback of a moving picture according to an exemplary embodiment of the present invention. Here, a first storage device 150, a second storage device 600, and a third storage device 700 exist and it is assumed that the first storage device 150 has the highest preference, followed by the second storage device 600 and the third storage device 700.

The SRS of the recording unit 110 generates a reserved-record object based on the reserved-record-setting value set by a user (operation S710). Here, the reserved-record object is managed by the CDS-managing unit 120 as a playlist container.

Before starting a recording, the recording-device-selecting unit searches for a recording device list selected by a user at reserved recording time, and selects a recording device (e.g., the first storage device) among the found available devices based on preferences of each device. The CDS-managing unit manages information on the selected recording device as a record schedule. The recording unit 110 can select a next storage device by referring to the record schedule when the space of the storage device is insufficient, and therefore it is possible to overcome errors that occur due to a shortage of storage space.

The SRS selects a storage device that will store a moving picture based on an order of the recording device set in the record schedule and the information selected by the recording-device-selecting unit (operation S720). Here, the HDD (i.e., the first storage device 150) within the first preferred device (e.g., PVR1) is selected.

When the scheduled recording starts (operation S730), the selected first-storage device 150 stores the moving picture (operation S740). The storage method depends upon the device manufacturer. However, because the name of the generated moving picture file is set by the SRS as a URL, it is possible to read the moving picture file by accessing the first storage device through the URL information.

If an error occurs because the space of the first storage device 150 is insufficient (operation S750), the SRS of the recording unit 110 is notified of the error. The SRS verifies a next preferred storage device through information on the recording device managed as the record schedule in the CDS, and generates an item (operation S760_). The item is managed by the CDS-managing unit 120 as a playlist item that is stored as a lower object of the playlist container. The CDS-managing unit 120 updates a URL, including a first file name, of the playlist item.

Then, a scheduled recording starts (operation S770) in the second storage device 600 (e.g., a PC) whose preference is the second highest, so the moving picture is stored in the second storage device 600 (operation S780). When the moving picture has been stored in the second storage device 600, the SRS generates an item (operation S790). The item is managed by the CDS-managing unit 120 as a playlist item.

Then, after the recording is completed in operation S800, the CDS-managing unit 120 creates a URL of the moving picture file generated in the playlist item.

Figure 8:
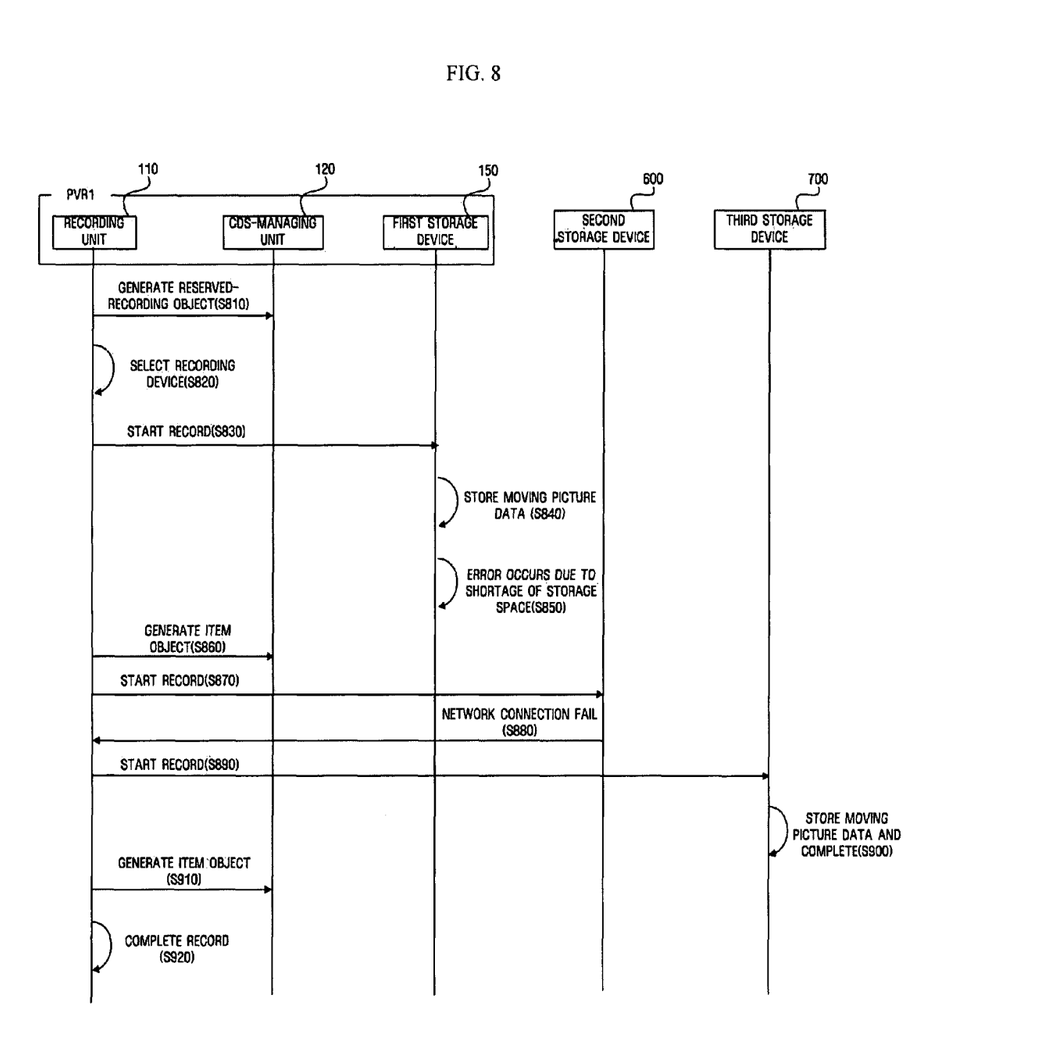
FIG. 8 is a flow chart showing a case where moving picture is dispersedly stored in a first and third storage device according to a method of controlling a dispersion recording and playback of a moving picture according to an exemplary embodiment of the present invention.

FIG. 8 is a flow chart showing a case where moving picture is dispersedly stored in a first and third storage device of a method of controlling a dispersion recording and playback of moving picture according to an exemplary embodiment of the present invention. Here, a first storage device 150, a second storage device 600, and a third storage device 700 exist and it is assumed that the first storage device has the highest preference, followed by the second storage device and the third storage device.

The SRS of the recording unit 110 generates a reserved-record object based on the reserved-record-setting value set by a user (operation S810). Here, the reserved-record object is managed by the CDS-managing unit 120 as a playlist container.

Before starting a record, the recording-device-selecting unit searches for a recording device list selected by a user at a scheduled recording time, and selects a recording device (e.g., the first storage device) among the found available devices based on preferences of each device. The CDS-managing unit manages information on the selected recording device as a record schedule. The recording unit 110 can select a next storage device by referring to the record schedule when a space of the storage device is insufficient, and therefore it is possible to overcome errors that occur due to a shortage of storage space.

The SRS selects a storage device that will store a moving picture based on an order of the recording device set in the record schedule and the information selected by the recording-device-selecting unit (operation S820). Here, the HDD (i.e., the first storage device 150) within the first preferred device (e.g., PVR1) is selected.

When the scheduled recording starts (operation S830), the selected first-storage device 150 stores the moving picture (operation S840). A storage method depends upon the device manufacturer. However, because the name of the generated moving picture file is set by the SRS as a URL, it is possible to read the moving picture file by accessing the first storage device through the URL information.

If an error occurs because the space of the first storage device 150 is insufficient (operation S850), the SRS of the recording unit 110 is notified of the error. The SRS verifies a next preferred storage device through information on the recording device managed as the record schedule in the CDS, and generates an item (operation S860). The item is managed by the CDS-managing unit 120 as a playlist item that is stored as a lower object of the playlist container. The CDS-managing unit 120 updates URL, including a first file name, of the playlist item.

Then, a scheduled recording is performed in the second storage device 600 (e.g., a PC) whose preference is the second highest (operation S870). If the second storage device 600 is disconnected from the network, or if network cannot be connected to due to a problem of the device (operation S880), the SRS is notified of the network connection failure. The SRS verifies a next preferred storage device through information on the recording device managed as the record schedule in the CDS.

Then, a scheduled recording (operation S890) is performed in the third storage device 700 (e.g., PVR2) whose preference is the third highest, and the moving picture is stored in the third storage device 700 (operation S900). When the moving picture has been stored in the third storage device 700, the SRS generates an item (operation S910). The item is managed by the CDS-managing unit 120 as a playlist item.

Then, the record performing is completed (operation S920). The CDS-managing unit 120 reflects a URL of the generated moving picture file in the playlist item.

Figure 9:
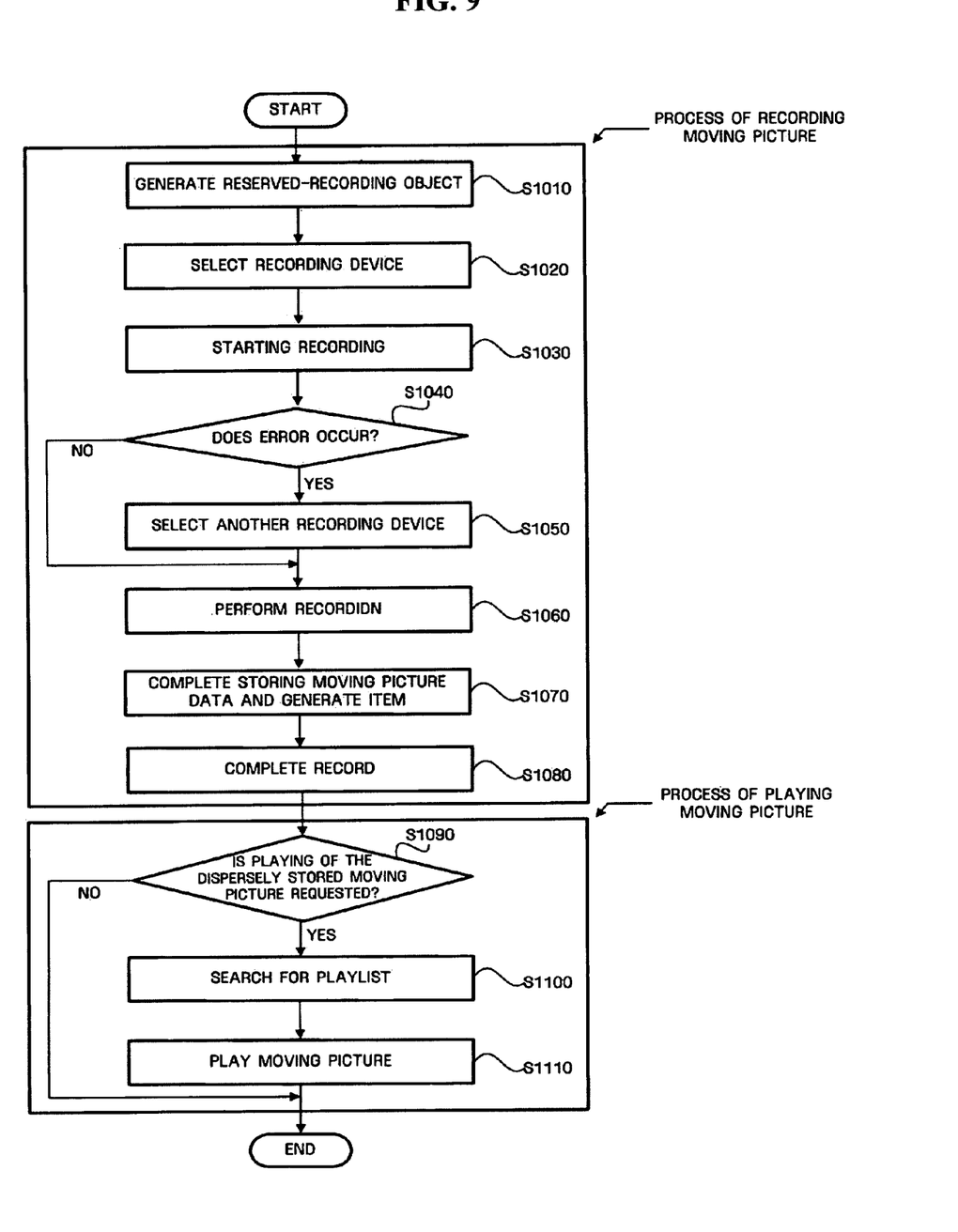
FIG. 9 is a flow chart showing a method of controlling a dispersion recording and playback of a moving picture according to an exemplary embodiment of the present invention.

FIG. 9 is a flow chart showing a method of controlling a dispersion recording and playback of a moving picture according to an exemplary embodiment of the present invention.

The SRS of the recording unit 110 generates a reserved-recording object based on the reserved-record-setting value set by a user (operation S1010). Here, the reserved-recording object is managed by the CDS-managing unit 120 as a playlist container.

The SRS selects a storage device that will store a moving picture based on an order of the recording device set in the record schedule and the information selected by the recording-device-selecting unit 130 (operation S1020). Here, the HDD (i.e., the first storage device 150) within the first preferred device (e.g., PVR1) is selected.

When the scheduled recording starts, the selected first-storage device 150 stores the moving picture (operation S1030). If an error occurs because the space of the first storage device 150 is insufficient (operation S1040), the error is notified to the SRS of the recording unit 110. The SRS verifies a next preferred storage device through information on the recording device managed as the record schedule in the CDS (operation S1050). If an error does not occur because the storage space is sufficient, operation 1050 is not performed.

Then, the SRS generates a moving picture file, and performs the recording (operation S1060). The recording is performed until a storage space is remained in the generated moving picture file.

If the storage space is insufficient while the record is performed, the SRS completes the recording, and then generates an item. Here, the generated item is managed by the CDS-managing unit 120 as a playlist item that is stored as a lower object of the playlist container. The CDS-managing unit 120 updates URL, including a first file name, of the playlist item.

Then, a scheduled record starts in the second storage device 600 (e.g., PC) whose preference is the second highest, and the moving picture is stored in the second storage device 600.

When the moving picture has been stored in the second storage device 600, the SRS generates an item (operation S1070). The item is managed by the CDS-managing unit 120 as a playlist item.

Then, the record performing is completed (operation S1080). The CDS-managing unit 120 reflects a URL of the moving picture file generated in the playlist item.

If a user requests play of a moving picture file that was dispersedly stored (operation S1090), the controller 160 tracks the position where the moving picture file is stored by referring to the playlist item stored in the CDS (operation S1100), and then continuously plays the moving picture (operation S1110).

If a user does not request play of a moving picture file that was dispersedly stored, operations 1090 through 1110 are not performed.

As described above, the apparatus and method for controlling a dispersion recording and playback of a moving picture according to the exemplary embodiments of the present invention may produce one or more of the effects described below.

When an error occurs due to a shortage of storage space while a moving picture file is recorded, the SRS can dispersedly store the moving picture file in storage devices that exist in a network, based on information on the recording device managed as a recording schedule.

It is possible to continuously play the moving picture file that was dispersedly stored at the recording time similar to a single file without additionally searching for a storage device in which the recorded moving picture file exists based on the playlist.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling a dispersion record of a moving picture, the apparatus comprising:
   a recording unit that generates a record schedule in response to a moving picture being scheduled for recording, and records, dispersedly, the moving picture in a first storage device, and a second storage device if an error occurs due to insufficient storage space when the moving picture is being recorded in the first storage device;
   a recording-device-selecting unit that selects a recording device based on preferences of the first storage device and the second storage device before the moving picture is recorded;
   a content directory service CDS-managing unit that manages recording information of the recorded moving picture, information of the moving picture that has been recorded and information on the recording devices and storage devices used to record the moving picture,
   a playlist-managing unit that manages a playlist of the moving picture that is dispersedly recorded; and
   a controller that continuously plays the dispersedly recorded moving picture file by referring to the playlist.

2. The apparatus of claim 1, wherein the recording unit generates a reserved-recording object at the reserved recording time and an item object if a process of storing a moving picture is completed or if an error occurs due to a shortage of storage space.

3. The apparatus of claim 1, wherein the recording unit searches for another storage device that will dispersedly store the moving picture based on information on the recording device if an error occurs due to a shortage of storage space in the first storage device.

4. The apparatus of claim 1, wherein the CDS-managing unit manages the reserved-recording object as a playlist container object, the item object as a playlist item object, and the information on the recording devices as a record schedule object.

5. The apparatus of claim 1, wherein the playlist item provides information on the first storage device and the second storage device where the moving picture is recorded.

6. A method of controlling a dispersion recording of a moving picture, the method comprising:
   generating a record schedule in response to a moving picture being scheduled for recording;
   selecting a recording device based on preferences of each storage device of a plurality of storage devices before the moving picture is recorded;
   storing the moving picture in a first storage device associated with the selected recording device;
   determining whether an error occurred due to insufficient storage space in the first storage device;
   generating an item object in response to the error and dispersedly storing the moving picture in a second storage device, if the error is determined; and
   continuously playing the moving picture, dispersedly stored on the first storage device and the second storage device by referring to a playlist.

7. The method of claim 6, further comprising generating a reserved-recording object for the scheduled recording;
   and generating a record schedule object having information on the selected recording device,
   wherein the reserved-recording object is managed as a playlist container object, the item object is managed as a playlist item object, and the information on the recording device is managed as the record schedule object.

8. The method of claim 6, wherein the second storage device is selected based on the preferences of each recording device.

* * * * *